United States Patent Office 3,544,531
Patented Dec. 1, 1970

3,544,531
METHOD OF VULCANIZING RUBBER WITH DIALKOXYPHOSPHINOTHIOYL AMINO DISULFIDES
Eiichi Morita, St. Albans, W. Va., assignor to Monsanto Company, St. Louis, Mo., a corporation of Delaware
No Drawing. Filed Feb. 29, 1968, Ser. No. 709,201
Int. Cl. C07f 9/02; C08f 27/06
U.S. Cl. 260—79.5        11 Claims

ABSTRACT OF THE DISCLOSURE

Compounds of the formula:

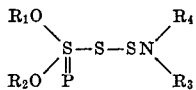

where $R_1$, $R_2$, $R_3$, and $R_4$ are alkyl, aralkyl, alicyclic, or $R_3$ and $R_4$ taken together with the nitrogen form a heterocycle are described together with their use as accelerating and vulcanizing agents for diene rubber.

---

The invention relates to dialkoxyphosphinothioyl amino disulfides.

The new compounds may be represented by the formula

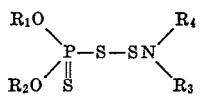

where $R_1$, $R_2$, $R_3$, and $R_4$ are alkyl, aralkyl, alicyclic, or $R_3$ and $R_4$ together with the nitrogen form a heterocycle. Examples of $R_1$, $R_2$, $R_3$, and $R_4$ are methyl, ethyl, propyl, isopropyl, butyl, sec-butyl, tert-butyl, isobutyl, amyl, hexyl, heptyl, octyl, 2-ethylhexyl, nonyl, decyl, undecyl, dodecyl, cyclohexyl, cyclopentyl, cyclooctyl, benzyl, and phenethyl. Preferably, $R_1$ and $R_2$ are lower alkyl and $R_3$ and $R_4$ are part of a heterocycle. Where $R_3$ and $R_4$ with the nitrogen comprise a heterocycle, typical suitable examples comprise 1-pyrrolidinyl, piperidino, hexamethylenimino, heptamethylenimino, octamethylenimino, morpholino, 2,6-dimethylmorpholino, 5-ethyl-2-methylpiperidino, azabicyclo[3.2.2]non-3-yl, and 2,5-dimethyl 1-pyrrolidinyl. Examples of the new compounds are Diethoxyphosphinothioyl dimethylamino disulfide
Diethoxyphosphinothioyl diethylamino disulfide
Diethoxyphosphinothioyl dipropylamino disulfide
Diethoxyphosphinothioyl dibutylamino disulfide
Diethoxyphosphinothioyl diamylamino disulfide
Diethoxyphosphinothioyl dihexylamino disulfide
Diethoxyphosphinothioyl dioctylamino disulfide
Diethoxyphosphinothioyl dicyclohexylamino disulfide
Diamyloxyphosphinothioyl morpholino disulfide Other examples of the compounds and their method of preparation are illustrated in the examples following, but these are merely illustrative of the invention.

EXAMPLE 1

Through a mixture of 23.2 grams of N,N'-dithiodipiperidine and 100 ml. of carbon tetrachloride is passed at —7° C. in 13 minutes 7.5 grams of chlorine. The solution obtained is then added dropwise at a temperature of —9° C. in 30 minutes to a stirred solution of 37.2 grams of O,O-diethyl phosphorodithioic acid and 21.2 grams of triethylamine in 100 ml. of carbon tetrachloride. Stirring is continued for 2.5 hours at —5° C. to 0° C., the solution is filtered, and the precipitate is washed with carbon tetrachloride. The carbon tetrachloride is removed in a rotary evaporator from the combined washing and filtrate; the residue is redissolved in ether and washed with water. The ethereal solution is dried with sodium sulfate, and the ether is removed in vacuo with slight warming. The reaction yields 40.8 grams of diethoxyphosphinothioyl piperidino disulfide in the form of an amber liquid. Analysis gives 31.78%, 31.73% sulfur, 4.96%, 5.08% nitrogen, and 8.18%, 8.39% phosphorus as compared to 31.91% sulfur, 4.65% nitrogen, and 10.28% phosphorus calculated for $C_9H_{20}NO_2PS_3$.

EXAMPLE 2

To a solution of 11 grams of chlorine in 100 ml. of carbon tetrachloride is added with cooling and stirring at a temperature of 0° to 5° C. over a 30-minute period 35.5 grams of 4,4'-dithiodimorpholine in 100 ml. of carbon tetrachloride. This solution is then added with cooling and stirring at a temperature of 0° to 1° C. over a 16-minute period to a solution of 55.9 grams of O,O-diethyl phosphorodithioic acid and 32.3 grams of triethylamine in 100 ml. of carbon tetrachloride. The reaction mixture is then filtered. The precipitate is washed with carbon tetrachloride and the washings combined with the filtrate. The carbon tetrachloride is removed in a rotary evaporator. There is a crude yield of 96.8 grams. The filtrate is redissolved in ether and more precipitate is formed. The ethereal solution is filtered; the filtrate is washed three times with water and dried with sodium sulfate. The ether is evaporated in vacuo with slight warming. Diethoxyphosphinothioyl morpholino disulfide is obtained as an amber liquid. Analysis gives 31.93%, 32.36% sulfur, 3.73% nitrogen, and 10.08% phosphorus as compared to 31.70% sulfur, 4.62% nitrogen, and 10.21% phosphorus calculated for $C_8H_{18}NO_3PS_3$.

EXAMPLE 3

To a solution of 12 grams of chlorine in 100 ml. of carbon tetrachloride is added at a temperature of 0° to 5° C. in a period of 7 minutes a mixture of 35.5 grams of 4,4'-dithiodimorpholine and 100 ml. of carbon tetrachloride. This solution is then added at a temperature of 5° C. over a period of 20 minutes to a solution of 64.3 grams of O,O-diisopropyl phosphorodithioic acid and 32.3 grams of triethylamine in 100 ml. of carbon tetrachloride. The reaction mixture is filtered and the precipitate is washed with carbon tetrachloride. The carbon tetrachloride is removed in a rotary evaporator from combined washing and filtrate. There is a crude yield of 107 grams. The crude product is redissolved in ether and treated as in Example 2. Diisopropoxyphosphinothioyl morpholino disulfide is obtained as an amber liquid, from which a solid precipitates upon standing. Analysis of the liquid fraction gives 29.17%, 29.36% sulfur, 3.33% nitrogen, and 9.83% phosphorus as compared to 29.02% sulfur, 4.23% nitrogen, and 9.35% phosphorus calculated for $C_{10}H_{22}NO_3PS_3$.

EXAMPLE 4

Through a mixture of 21.5 grams of N,N'-dithiodipiperidine and 100 ml. of carbon tetrachloride is passed 7.5 grams of chlorine at 0°C. in 30 minutes. The solution obtained is added dropwise at 0° to 5°C. over a period of 42 minutes to a stirred solution of 44.9 grams of O,O-di-n-butyl phosphorodithioic acid and 19.7 grams of triethylamine in 100 ml. of carbon tetrachloride. Stirring is continued for three hours and the temperature of the mixture allowed to rise from 5° to 23°C. The mixture is filtered and treated as in Example 1. A yield of 52 grams of dibutoxyphosphinothioyl piperidino disulfide is obtained as an amber liquid. Analysis gives 26.04%, 26.21% sulfur, 3.59% nitrogen, and 7.82% phosphorus as compared to 26.91% sulfur, 3.92% nitrogen, and 8.66% phosphorus calculated for $C_{13}H_{28}NO_2PS_3$.

EXAMPLE 5

To a stirred solution of 11 grams of chlorine in 100 ml. of carbon tetrachloride is added at 0° to 3°C. 38 grams of 4,4'-dithiodimorpholine in 100 ml. of carbon tetrachloride. This solution is added with stirring at a temperature of 0° to 5°C. to a solution of 64.3 grams of O,O-di-n-propyl phosphorodithioic acid and 32.3 grams of triethylamine in 100 ml. of carbon tetrachloride. Stirring is continued for 30 minutes and the reaction mixture is washed with water three times using about 200 ml. of water each time. The mixture is dried with sodium sulfate, and the carbon tetrachloride is removed in a rotary evaporator. The reaction product is redissolved in ether, rewashed with water, and again dried with sodium sulfate. The ether is removed in vacuo. There is obtained 89.5 grams of dipropoxyphosphinothioyl morpholino disulfide as a yellow liquid. Analysis gives 28.0%, 28.1% sulfur, 3.86% nitrogen, and 8.73% phosphorus as compared to 29.02% sulfur, 4.23% nitrogen, and 9.43% phosphorus calculated for $C_{10}H_{22}NO_3PS_3$.

EXAMPLE 6

To a stirred solution of 11 grams of chlorine in 100 ml. of carbon tetrachloride is added at a temperature of 0° to 5° C. 38 grams of 4,4'-dithiodimorpholine in 100 ml. of carbon tetrachloride. This solution is added with stirring at a temperature of 0° to 5° C. to a solution of 72.7 grams of O,O-di-n-butyl phosphorodithioic acid and 32.3 grams of triethylamine in 100 ml. of carbon tetrachloride. Stirring is continued for 30 minutes and the reaction mixture is treated as in Example 5. There is obtained 90.5 grams of dibutoxyphosphinothioyl morpholino disulfide as a yellow liquid. Analysis gives 25.62%, 25.67% sulfur, 3.92% nitrogen, and 8.33% phosphorus as compared to 26.76% sulfur, 3.90% nitrogen, and 8.62% phosphorus calculated for $C_{12}H_{26}O_3PS_3N$.

EXAMPLE 7

Through a solution of 36 grams of N,N'-dithiodipiperidine in 200 ml. of carbon tetrachloride is passed 13 grams of chlorine at a temperature of 0° to 4° C. over a period of 14 minutes. The solution is then added dropwise at a temperature of 0° to 5° C. to a stirred mixture of 64.3 grams of O,O-di-n-propyl phosphorodithioic acid and 32.3 grams of triethylamine in 100 ml. of carbon tetrachloride. Stirring is continued for 30 minutes, and the reaction mixture is treated as in Example 5. There is obtained 90 grams of dipropoxyphosphinothioyl piperidino disulfide as an amber liquid. Analysis gives 26.46%, 25.93% sulfur, 3.27% nitrogen, and 8.17% phosphorus as compared to 29.20% sulfur, 4.25% nitrogen, and 9.40% phosphorus calculated for $C_{11}H_{24}NO_2PS_3$.

EXAMPLE 8

To a stirred solution of 20.5 grams of sulfur dichloride in 150 ml. of carbon tetrachloride is added at a temperature of 0° to 2° C. over a period of 13 minutes a mixture of 26 grams of 3-azabicyclo[3.2.2]nonane and 22.2 grams of triethylamine in 100 ml. of carbon tetrachloride. Stirring is continued for 25 minutes and the slurry obtained is added over a period of 10 minutes to a mixture of 37.2 grams of O,O-diethyl phosphorodithioic acid and 22.2 grams of triethylamine in 150 ml. of carbon tetrachloride. Stirring is continued for 3.25 hours, and the reaction mixture is treated as in Example 5. The product is transferred to a flask and stripped of residual solvent under 1 mm. Hg vacuum with slight warming. There is obtained 52 grams of 3-azabicyclo[3.2.2]non-3-yl diethoxyphosphinothioyl disulfide as a heavy amber liquid. Analysis gives 26.35%, 26.33% sulfur, 3.93% nitrogen, and 7.58% phosphorus as compared to 28.17% sulfur, 4.10% nitrogen, and 9.07% phosphorus calculated for $C_{12}H_{24}NO_2PS_3$.

EXAMPLE 9

To a solution of 20.5 grams of sulfur dichloride in 150 ml. of carbon tetrachloride is added dropwise at a temperature of 0° C. a mixture of 26 grams of 3-azabicyclo-[3.2.2]nonane and 22.2 grams of triethylamine in 150 ml. of carbon tetrachloride. This slurry is added with stirring at a temperature of 0° C. over a 15-minute period to a solution of 48.5 grams of O,O-di-n-propyl phosphorodithioic acid and 22.2 grams of triethylamine in 150 ml. of carbon tetrachloride. Stirring is continued for 3 hours, and the reaction mixture is treated as in Example 5. There is obtained 71 grams of 3-azabicyclo[3.2.2]-non-3-yl dibutoxyphosphinothioyl disulfide as an amber liquid. Analysis gives 22.14%, 22.41% sulfur, 3.39% nitrogen, and 5.99% phosphorus as compared to 24.19% sulfur, 3.52% nitrogen, and 7.79% phosphorus calculated for $C_{16}H_{32}NO_2PS_3$.

EXAMPLE 10

To a solution of 20.6 grams of sulfur dichloride and 150 ml. of carbon tetrachloride is added dropwise at a temperature of 0° to 5° C. over a period of 30 minutes a mixture of 8.6 grams of piperazine anhydride and 22.2 grams of triethylamine in 100 ml. of carbon tetrachloride. An additional 100 ml. of carbon tetrachloride is added to break up the heavy mass formed. This slurry is added at a temperature of 0° C. over a period of 20 minutes to a solution of 37.2 grams of O,O-diethyl phosphorodithioic acid and 22.2 grams of triethylamine in 150 ml. of carbon tetrachloride. Cooling is discontinued, the mixture is stirred for 4.5 hours, and the temperature is allowed to rise to 20° C. The reaction mixture is filtered and the filtrate washed with water and dried with sodium sulfate. The carbon tetrachloride is removed in vacuo and 44.8 grams of crude product is obtained which gradually solidifies on standing. The solid is digested with ether, washed with water, dried with sodium sulfate, and the solvent removed in vacuo. Purified 1,4-bis(diethoxyphosphinothioyldithio)piperazine is obtained as a light straw solid, melting point 90.5°–92° C. Analysis gives 37.68%, 36.75% sulfur, 5.74% nitrogen, and 10.97% phosphorus as compared to 37.09% sulfur, 5.40% nitrogen, and 11.94% phosphorus calculated for $C_{12}H_{28}N_2O_4P_2S_6$.

EXAMPLE 11

To a stirred solution of 20.6 grams of sulfur dichloride in 250 ml. of carbon tetrachloride is added at a temperature of 0° C. over a period of 32 minutes a mixture of 8.6 grams of piperazine anhydride and 22.2 grams of triethylamine in 200 ml. of carbon tetrachloride and stirring continued for 20 minutes. This mixture is then added at a temperature of 0° to 5° C. over a 20-minute period to a solution of 48.6 grams of O,O-di-n-butyl phosphorodithioic acid and 22.2 grams of triethylamine in 150 ml. of carbon tetrachloride. Stirring is continued for 30 minutes at a temperature of −3° to −5° C. Cooling is removed, the mixture is stirred for 90 minutes, and the temperature is allowed to rise to 25° C. The reaction mixture is filtered, washed with carbon tetrachloride, and the filtrate washed with 200 ml. of water four times. The filtrate is dried with sodium sulfate and the carbon tetrachloride removed in a rotary evaporator. There is obtained 66 grams of 1,4-bis(dibutoxyphosphinothioyldithio) piperazine as a dark amber liquid. Analyses indicate presence of residual solvent which is further stripped in vacuo and the sample retested. Analysis gives 30.03%, 29.94% sulfur, 4.23% nitrogen, and 9.14% phosphorus as compared to 30.49% sulfur, 4.44% nitrogen, and 9.82% phosphorus calculated for $C_{20}H_{44}N_2O_4P_2S_6$.

EXAMPLE 12

To a mixture of 37.8 grams of 83.4% O,O-dimethyl phosphorodithioic acid and 22.2 grams of triethylamine in 200 ml. of carbon tetrachloride is added with stirring at a temperature of 0° to 5° C. over a period of 29 minutes a morpholino sulfenylchloride solution prepared by adding a mixture of 23.6 grams of 4,4'-dithiodimorpholine in 75 ml. of carbon tetrachloride to a solution of 7.1 grams of chlorine in 75 ml. of carbon tetrachloride at 0°–15° C. in 10 minutes. Stirring is continued for 1.25 hours, the mixture is washed with water, dried with sodium sulfate, and filtered. The carbon tetrachloride is removed in vacuo. There is obtained 44.8 grams of dimethoxyphosphinothioyl morpholino disulfide, also named S-morpholino-O,O'-dimethyl phosphorotrithioate, as an amber liquid. Analysis gives 34.44%, 34.36% sulfur, 4.44% nitrogen, and 11.54% phosphorus compared to 34.93% sulfur, 5.09% nitrogen, and 11.25% phosphorus calculated for $C_6H_{14}NO_3PS_3$.

EXAMPLE 13

To a solution of 20.6 grams of sulfur dichloride in 150 ml. of carbon tetrachloride is added with stirring at a temperature of 0° to 5° C. a solution of 19.4 grams of 2,5-dimethylpyrrolidine and 20.2 grams of triethylamine in 100 ml. of carbon tetrachloride. Stirring is continued for 50 minutes and the slurry obtained is added at a temperature of 2° to 8° C. to a solution of 37.2 grams of O,O-diethyl phosphorodithioic acid and 22.2 grams of triethylamine in 150 ml. of carbon tetrachloride. Stirring is continued for a total of 3 hours. The reaction mixture is poured into water, washed five times, and dried with sodium sulfate. The carbon tetrachloride is removed in a rotary evaporator, and nitrogen is bubbled through the product to remove residual solvent. There is obtained 41.5 grams of diethoxyphosphinothioyl 2,5-dimethyl-1-pyrrolidinyl disulfide, also named S-(2,5-dimethylpyrrolidinyl) - O,O' - diethyl phosphorotrithioate, as a brown liquid. Analysis gives 31.49%, 31.27% sulfur, 4.16% nitrogen, and 9.57% phosphorus as compared to 30.50% sulfur, 4.44% nitrogen, and 9.82% phosphorus calculated for $C_{10}H_{22}NO_2PS_3$.

EXAMPLE 14

To a stirred solution of 10.3 grams of sulfur dichloride in 100 ml. of carbon tetrachloride is added at a temperature of 2° to 4° C. over a period of 13 minutes a solution of 9.7 grams of 2,5-dimethylpyrrolidine and 10.1 grams of triethylamine in 50 ml. of carbon tetrachloride. Stirring is continued for 45 minutes with cooling, and this slurry is added at a temperature of 0° to 5° C. over a period of 15 minutes to a solution of 24.3 grams of O,O-di-n-butyl phosphorodithioic acid and 11.1 grams of triethylamine in 100 ml. of carbon tetrachloride. The reaction mixture is treated as in Example 13. There is obtained 21.5 grams of dibutoxyphosphinothioyl 2,5-dimethyl-1-pyrrolidinyl disulfide, also named S - (2,5 - dimethylpyrrolidinyl)-O,O'-dibutyl phosphorotrithioate, as a brown liquid. Analysis gives 24.83%, 25.27% sulfur, 3.65% nitrogen, and 7.80% phosphorus as compared to 25.89% sulfur, 3.77% nitrogen, and 8.34% phosphorus calculated for $C_{14}H_{30}NO_2PS_3$.

The new compounds are valuable accelerating and vulcanizing agents for rubber. They are particularly useful as secondary accelerators for EPDM rubber. EPDM is the designation of ethylene-propylene diene monomer terpolymer rubber and is the name applied to the polymerized product from a polymerization of ethylene, propylene, and a small quantity of a diene. Amberg discusses the dienes which have been used with ethylene and propylene in Vulcanization of Elastomers, pages 324 and 325 (Alliger and Sjothum, editors, 1963). Amberg states: "Good results have been obtained with compounds which have one internal and one terminal double bond. Dicyclopentadiene is one of the preferred dienes, 2-methylene-norbornene and 11-ethyl-1,11-tridecadiene are examples of other monomers which react satisfactorily."

1,4-hexadiene, 2-ethylidene norbornene, and cyclooctadiene are also used as the diene monomer of the terpolymer. When the new compounds are used as secondary accelerators for EPDM rubber, the cross-linking efficiency is increased, generally with increased processing safety and increased rate of cure. Usually increased cross-linking efficiency must be obtained at the sacrifice of processing safety, and an increased rate of cure does not necessarily accompany a higher number of cross links.

The new compounds also act as vulcanizing agents for diene rubbers. Tests in natural rubber indicated stronger vulcanizing properties than with tetramethyl thiuram disulfide compared on an equimolar basis, and at the same time processing safety was increased. Tests in styrene-butadiene copolymer rubber indicated stronger accelerating action than with mercaptobenzothiazole, again with increased processing safety and a higher rate of cure.

In general, practice of this invention is intended with any of the rubbers containing sufficient unsaturation to render them vulcanizable with sulfur. Such rubbers contain residual olefinically-unsaturated linkages which render them sulfur-vulcanizable. Although the unsaturation may be small, any of the sulfur-vulcanizable rubbers may be used in the practice of this invention. These include butyl rubber, which is a synthetic rubber produced by the co-polymerization of isobutylene and a small percentage of butadiene or other diene such as isoprene. It contains at least 85% isobutylene and not more than 15% diene. A typical commercial product, GRI 117, is a copolymer of 97.5% isobutylene and 2.5% isoprene. Suitable elastomers of higher functionality include polyisoprene, polybutadiene, butadiene-acrylonitrile copolymer rubber, 2-methyl butadiene-1,3 polymer, butadiene-methyl methacrylate copolymer, styrene-butadiene copolymer, cis-polyisoprene and cis-polybutadiene, and mixtures thereof.

The following tables illustrate the invention in more detail. In Table I the following base formulation is used:

| | Parts by weight |
|---|---|
| EPDM (Nordel 1070) | 100.0 |
| Carbon black (HAF) | 80.0 |
| Zinc oxide | 5.0 |
| Naphthenic oil plasticizer | 40.0 |

In addition, the following parts by weight are added on a mill:

| | |
|---|---|
| Tetramethyl thiuram disulfide | 0.5 |
| 2,2'-dithiobis(benzothiazole) | 1.5 |
| Sulfur | 1.5 |
| Test compound | 2.0 |

The uncured compositions are tested for processing safety or scorch delay at 135° C. The stocks are compared with a control stock which contains the above ingredients without the test compound. The stocks are heated to 135° C. in a Mooney Plastometer. The time in minutes required for the viscosity of the stock to increase 5 units above the minimum viscosity is determined. These values are commonly known as "Mooney Scorch Time" ($t_5$). The time between $t_5$ and the time to reach 35 units above the minimum reading, $t_{35-5}$, is a measure of the rate of cure. Curing characteristics of the stocks at 160° C. are determined by means of the Monsanto Oscillating Disk Rheometer described by Decker, Wise, and Guerry in Rubber World, December 1962, page 68. The cross-link efficiency or Maximum Rheometer torque ($R_{max}$) is compared to the control stock by assigning the following relative value:

$$R_{max}. \text{ (rel.)} = \frac{R_{max}. \text{ of stock containing test compound}}{R_{max}. \text{ of control stock}} \times 100$$

TABLE I

| Test compound | $t_5$ | $t_{35-5}$ | $R_{max}$. (rel.) |
|---|---|---|---|
| Control | 12.7 | 6.3 | 100 |
| Diethoxyphosphinothioyl piperidino disulfide | 12.3 | 5.4 | 105 |
| Diethoxyphosphinothioyl morpholino disulfide | 13.7 | 5.6 | 107 |
| Diisopropoxyphosphinothioyl morpholino disulfide | 15.0 | 5.3 | 109 |
| Dibutoxyphosphinothioyl piperidino disulfide | 13.3 | 5.3 | 108 |
| Dipropoxyphosphinothioyl morpholino disulfide | 15.1 | 6.2 | 110 |
| Dibutoxyphosphinothioyl morpholino disulfide | 15.1 | 6.2 | 109 |
| Dipropoxyphosphinothioyl piperidino disulfide | 13.7 | 5.3 | 110 |
| 1,4-bis(diethoxyphosphinothioyldithio)-piperazine | 15.8 | 6.9 | 107 |
| 1,4-bis(dibutoxyphosphinothioyldithio)-piperazine | 14.7 | 5.9 | 113 |
| 3-azabicyclo[3.2.2]non-3-yl diethoxy-phosphinothioyl disulfide | 12.8 | 4.9 | 108 |
| 3-azabicyclo[3.2.2]non-3-yl dibutoxyphosphinothioyl disulfide | 13.1 | 4.9 | 111 |

The following examples illustrate the use of the new compounds as vulcanizing agents for natural rubber accelerated by N-tert-butyl 2-benzothiazole sulfenamide. An A-1 masterbatch is used in preparing the compositions. An A-1 masterbatch comprises:

| | Parts by weight |
|---|---|
| Smoked sheets | 100 |
| Carbon black (HAF) | 50 |
| Zinc oxide | 5 |
| Stearic acid | 3 |
| Hydrocarbon softener | 3 |

To the matsterbatch is added one part by weight of accelerator, tert-butyl 2-benzothiazole sulfenamide. To separate portions of the masterbatch containing accelerator, vulcanizing agents are added as follows. The new vulcanizing agents are compared to tetramethyl thiuram disulfide on an equimolar basis.

| | Parts by weight | | | | |
|---|---|---|---|---|---|
| Stocks | A | B | C | D | E |
| Vulcanizing agent: | | | | | |
| Tetramethylthiuram disulfide | 2.4 | | | | |
| Diethoxyphosphinothioyl piperidino disulfide | | 3.01 | | | |
| Diethoxyphosphinothioyl morpholino disulfide | | | 3.03 | | |
| Diisopropoxyphosphinothioyl morpholino disulfide | | | | 3.31 | |
| Dibutoxyphosphinothioyl piperidino disulfide | | | | | 3.58 |

The stocks so compounded are cured by heating in the usual manner in a press for 65 minutes at 144° C. except Stock D, which is heated for 45 minutes. The time of heating is determined from curing characteristics obtained by use of the Monsanto Oscillating Disk Rheometer. The time to reach maximum torque is taken as the time for optimum cure, and the stocks are press cured for the time so determined. The processing safety is also evaluated by means of the rheometer. The time recorded is the time to reach two rheometer units above the minimum reading, $T_2$. Also noted is the time to reach 95% of the maximum torque designated $T_{95}$. The results follow:

TABLE II

| Stock | A | B | C | D | E |
|---|---|---|---|---|---|
| Modulus of elasticity at 300% elongation, lbs./in.² | 1,450 | 1,880 | 1,830 | 1,860 | 1,600 |
| Tensile strength at break lbs./in.² | 3,500 | 3,700 | 3,640 | 3,800 | 3,550 |
| Ultimate elongation, percent | 500 | 480 | 480 | 480 | 490 |
| Rheometer $T_2$ | 5.9 | 7.8 | 7.8 | 11.0 | 11.0 |
| Rheometer $T_{95}$ | 27.2 | 23.5 | 23.6 | 33.0 | 28 |

The addition of 0.5 part of dibutoxyphosphinothioyl morpholino disulfide and 2.5 parts sulfur to the A-1 masterbatch provides a composition which, after curing 75 minutes at 153° C., develops modulus and tensile properties of 1690 and 2500 pounds per square inch, respectively. The ultimate elongation is 400%.

To illustrate the properties for acceleration of vulcanization of styrene-butadiene copolymer rubber, vulcanizable compositions are compounded comprising:

| | Parts by weight | |
|---|---|---|
| Stocks | F | G |
| Styrene-butadiene copolymer | 100 | 100 |
| Carbon black (HAF) | 50 | 50 |
| Zinc oxide | 4 | 4 |
| Stearic acid | 2 | 2 |
| Hydrocarbon softener | 10 | 10 |
| Sulfur | 1.75 | 1.75 |
| Mercaptobenzothiazole | 1.2 | |
| Dibutoxyphosphinothioyl morpholino disulfide | | 1.2 |

The stocks so compounded are evaluated by means of the Mooney Plastometer for processing safety and rate of cure and then cured by heating in a press at 153° C. for 85 minutes. The results follow:

TABLE III

| Stock | F | G |
|---|---|---|
| Modulus of elasticity at 300% elongation, lbs./in.² | 1,200 | 1,550 |
| Tensile strength at break, lbs./in.² | 3,090 | 3,040 |
| Ultimate elongation, percent | 600 | 500 |
| Mooney scorch, $t_5$ | 17.9 | 30.3 |
| Mooney, $t_{35-5}$ | 31.2 | 21.9 |

Properties in butyl rubber are illustrated by compositions comprising:

| | Parts by weight | |
|---|---|---|
| Stock | H | J |
| Butyl rubber | 100 | 100 |
| Carbon black (ISAF) | 40 | 40 |
| Zinc oxide | 5 | 5 |
| Stearic acid | 1 | 1 |
| Hydrocarbon softener | 10 | 10 |
| Sulfur | 1 | 1 |
| 2,2'-dithiobis(benzothiazole) | 1 | 1 |
| Dibutoxyphosphinothioyl piperidino disulfide | 3 | |
| Dibutoxyphosphinothioyl morpholino disulfide | | 3 |

The stocks are cured by heating in a press for 85 and 95 minutes, respectively. The following results are obtained:

TABLE IV

| Stock | H | J |
|---|---|---|
| Modulus of elasticity at 300% elongation, lbs./in.² | 850 | 890 |
| Tensile strength at break, lbs./in.² | 2,250 | 2,400 |
| Ultimate elongation, percent | 560 | 590 |

The stocks have hysteresis properties comparable to a commercial control.

It is intended to cover all changes and modifications of the examples of the invention herein chosen for purposes of disclosure which do not constitute departures from the spirit and scope of the invention. The matter contained in each of the following claims is to be read as part of the general description of the present invention.

I claim:

1. The process of vulcanizing a sulful-vulcanizable diene rubber which comprises heating the rubber with a compound of the formula

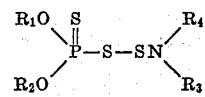

where $R_1$, $R_2$, $R_3$, and $R_4$ are alkyl, aralkyl, alicyclic, or $R_3$ and $R_4$ together with the nitrogen form a heterocycle.

2. The process of claim 1 where the rubber also contains elemental sulfur.

3. The process of claim 2 where the rubber also contains a thiazole accelerator.

4. The process of claim 3 where the rubber is ethylene-propylene diene terpolymer.

5. The process of claim 1 where $R_1$ and $R_2$ are lower alkyl and $R_3$ and $R_4$ with the nitrogen form a heterocycle.

6. The process of claim 5 where the rubber also contains elemental sulfur.

7. The process of claim 6 where the rubber is ethylene-propylene diene torpolymer.

8. The process of claim 6 where the rubber is natural rubber.

9. The process of claim 6 where the rubber is styrene-butadiene copolymer rubber.

10. The process of claim 6 where the rubber is butyl rubber.

11. The process of claim 6 where $R_3$ and $R_4$ with the nitrogen are morpholino.

References Cited

UNITED STATES PATENTS

| 2,891,059 | 6/1959 | Malz | 260—247.1 |
| 3,044,981 | 7/1962 | Malz | 260—45.9 |
| 3,419,521 | 12/1968 | Scott | 260—41.5 |

OTHER REFERENCES

Kemperman, T., Journal of Kautschuk and Gummi Kuntstoffe, 20, pp. 126–128. (March 1967).

JOSEPH L. SCHOFER, Primary Examiner

C. A. HENDERSON, Jr., Assistant Examiner

U.S. Cl. X.R.

260—239, 247.1, 268, 293.4, 326.82, 784, 785, 791, 792, 793, 934